United States Patent [19]

Chen et al.

[11] Patent Number: 5,546,548

[45] Date of Patent: Aug. 13, 1996

[54] ARBITER AND ARBITRATION PROCESS FOR A DYNAMIC AND FLEXIBLE PRIORITIZATION

[75] Inventors: Ray Chen, Folsom; Jeffrey L. Rabe, Gold River, both of Calif.

[73] Assignee: Intel Corporation, Santa Clara, Calif.

[21] Appl. No.: 40,518

[22] Filed: Mar. 31, 1993

[51] Int. Cl.$^6$ .................................................. G06F 13/00
[52] U.S. Cl. .......................... 395/296; 395/287; 395/288; 395/291; 395/293
[58] Field of Search .................................... 395/325, 287, 395/288, 291, 293, 296

[56] References Cited

U.S. PATENT DOCUMENTS

| | | | |
|---|---|---|---|
| 4,463,445 | 7/1984 | Grimes | 364/900 |
| 4,924,380 | 5/1990 | McKinney et al. | 364/200 |
| 4,941,086 | 7/1990 | Kriz | 364/200 |
| 5,060,139 | 10/1991 | Theus | 364/200 |
| 5,142,672 | 8/1992 | Johnson et al. | 395/500 |
| 5,148,545 | 9/1992 | Herbst et al. | 395/725 |
| 5,195,185 | 3/1993 | Marenin | 395/325 |
| 5,280,591 | 1/1994 | Garcia et al. | 395/325 |
| 5,369,748 | 11/1994 | McFarland et al. | 395/325 |

Primary Examiner—Jack B. Harvey
Assistant Examiner—John Travis
Attorney, Agent, or Firm—Blakely, Sokoloff, Taylor & Zafman

[57] ABSTRACT

A programmable arbiter providing for dynamic configuration of prioritization schemes is implemented using a simple, but effective structure. One or more arbiter banks are structured in a cascading manner. Each arbiter bank receives a predetermined number of the set of bus requests to be arbitrated. Each bank is separately programmed to provide a rotating or fixed priority scheme to evaluate the priority of the bus requests. Thus by separately programming the arbiter banks to operate in a fixed priority or rotating priority manner, a flexible, programmable arbiter is created which can operate according to a fixed, rotating or hybrid priority scheme and is adaptable to a variety of applications.

33 Claims, 8 Drawing Sheets

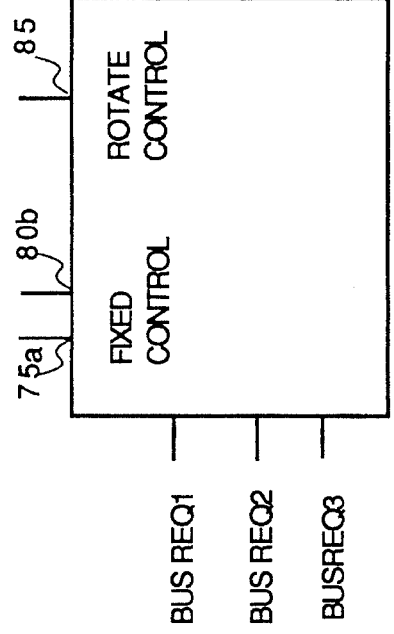
Figure 2a
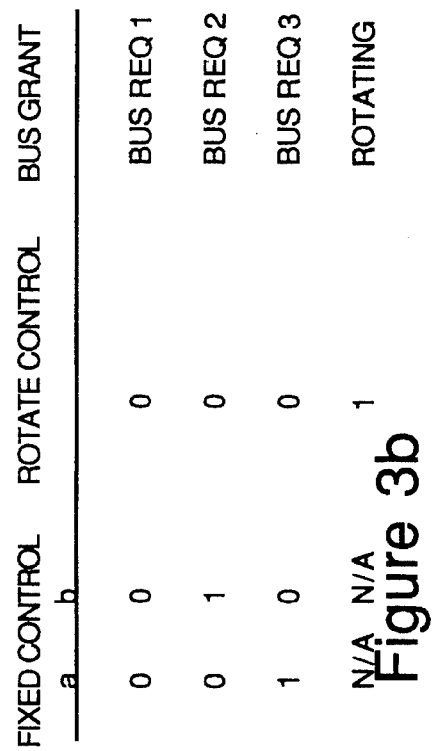
Figure 3a
| FIXED CONTROL | ROTATE CONTROL | BUS GRANT |
|---|---|---|
| 1 | 0 | BUS REQ 1 |
| 0 | 0 | BUS REQ 2 |
| N/A | 1 | ROTATING |
Figure 2b
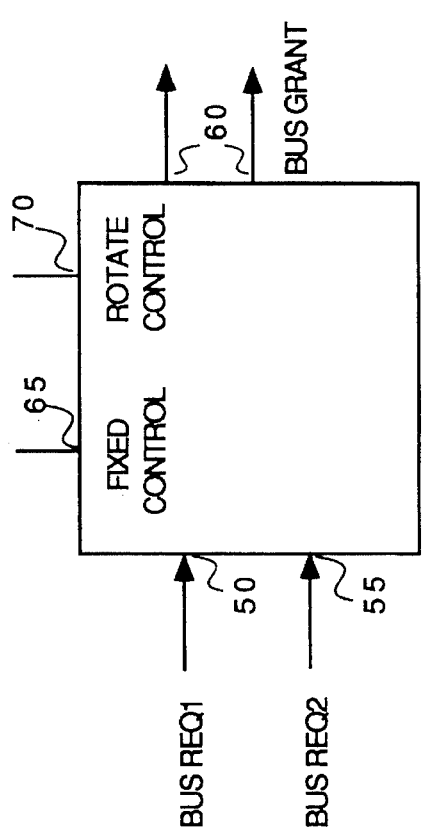
| FIXED CONTROL | | ROTATE CONTROL | BUS GRANT |
|---|---|---|---|
| a | b | | |
| 0 | 0 | 0 | BUS REQ 1 |
| 0 | 1 | 0 | BUS REQ 2 |
| 1 | 0 | 0 | BUS REQ 3 |
| N/A | N/A | 1 | ROTATING |
Figure 3b

| Mode | Bank | | | | Priority | | | |
|---|---|---|---|---|---|---|---|---|
| | 2a | 2b | 1 | 0 | Highest | | | LOWEST |
| 0 | 0 | 0 | 0 | 0 | SIOREQ# | REQ0# | REQ2# | CPUREQ# | REQ1# |
| 1 | 0 | 0 | 0 | 1 | REQ0# | SIOREQ# | REQ2# | CPUREQ# | REQ1# |
| 2 | 0 | 0 | 1 | 0 | SIOREQ# | REQ0# | REQ2# | REQ1# | CPUREQ# |
| 3 | 0 | 0 | 1 | 1 | REQ0# | SIOREQ# | REQ1# | REQ2# | CPUREQ# |
| 4 | 0 | 1 | 0 | 0 | REQ2# | CPUREQ# | REQ1# | SIOREQ# | REQ0# |
| 5 | 0 | 1 | 0 | 1 | REQ2# | CPUREQ# | SIOREQ# | REQ0# | SIOREQ# |
| 6 | 0 | 1 | 1 | 0 | REQ2# | REQ1# | CPUREQ# | SIOREQ# | REQ0# |
| 7 | 0 | 1 | 1 | 1 | REQ2# | REQ1# | SIOREQ# | REQ0# | SIOREQ# |
| 8 | 1 | 0 | 0 | 0 | CPUREQ# | REQ1# | REQ0# | SIOREQ# | REQ2# |
| 9 | 1 | 0 | 0 | 1 | CPUREQ# | REQ1# | SIOREQ# | REQ0# | REQ2# |
| A | 1 | 0 | 1 | 0 | REQ1# | CPUREQ# | SIOREQ# | REQ0# | REQ2# |
| B | 1 | 0 | 1 | 1 | REQ1# | CPUREQ# | REQ0# | SIOREQ# | REQ2# |
| | 1 | 1 | x | x | | Reserved | | |

Figure 4b

CONFIGURATION REGISTER

| Bit Number | Bit Name |
|---|---|
| Bit 0 | Bank 0 Fixed Priority mode select |
| Bit 1 | Bank 1 Fixed Priority mode select |
| Bit 2 | Bank 2 Fixed Priority mode select a |
| Bit 3 | Bank 2 Fixed Priority mode select b |
| Bit 4 | Bank 0 Rotate Control |
| Bit 5 | Bank 1 Rotate Control |
| Bit 6 | Bank 2 Rotate Control |
| Bit 7 | Reserved. Read as 0. |

*Figure 4c*

Mode 0
Mode 5
Mode 9
Mode 3
Mode 6
Mode A
Mode 0...

*Figure 4d*

ARBITER AND ARBITRATION PROCESS FOR A DYNAMIC AND FLEXIBLE PRIORITIZATION

BACKGROUND OF THE INVENTION

1. Field of the Invention

The present invention relates to an arbiter and process for implementing the same which permits flexible prioritization of access to a bus.

2. Art Background

In a computer system, buses are typically used to interconnect data and address paths among multiple components of the system. This limits the number of physical connections required among the different components by multiplexing access by the different components to the bus lines. However, quite frequently multiple components request access to the bus on or about the same time. It is preferable that access is granted based on a form of priority of access to the bus. Typically, an arbiter is employed to arbitrate access to the bus. Many different arbitration schemes exist and are well known; however, these schemes are typically fixed in priority and do not permit the arbiter to be dynamically modified to change the priority of arbitration. Although some arbiters permit devices to modify priority, this often requires a reassignment of the device's input to the arbiter. The reassignment process is not dynamic and requires that the device request line to the arbiter be physically moved to a different arbiter input representative of a different level of priority.

SUMMARY OF THE INVENTION

The present invention provides an arbiter and arbitration process which permits the generation of different prioritization schemes utilizing simple arbitration logic.

In the arbiter of the present invention, a plurality of banks are organized to provide a fixed, rotating or hybrid option for arbitration. Each bank can be separately programmed to provide a wide variety of arbitration schemes. The locations of device request inputs from the different devices requesting access to the bus remain constant; however, the function of each bank can be separately programmed to adapt the priority of arbitration desired. Each basic arbiter bank comprises two inputs. The first input identifies whether, for that particular bank, a rotating priority option is to be used. The second input indicates that if a fixed priority is to be used, the input which has the highest priority. The inputs to a bank are the device bus request signals. The output of the bank is the identification of the device which is granted priority for that bank of input requests. Thus, the output of a bank can be the signal which identifies the device which is granted access to the bus or a signal which is input as a bus request to the next bank connected in a cascading fashion in order to determine the device which ultimately is granted priority. Thus, using the fixed or rotating option in each of the basic arbiter banks and cascading the arbiter banks into multiple levels of arbiter banks, a number of prioritization schemes can be provided using simple and straightforward logic components which are easily constructed and implemented.

BRIEF DESCRIPTION OF THE DRAWINGS

The objects, features and advantages of the present invention will become apparent to one skilled in the art from the following detailed description in which:

FIG. 2a illustrates a basic arbiter bank having two bus request inputs; FIG. 2b is a table illustrating the logic for a basic arbiter bank.

FIG. 3a illustrates a basic three input arbiter bank; and FIG. 3b is a table setting forth the logic for the bank of FIG. 3a.

FIG. 4b is a table which sets forth one form of fixed priority logic for the arbiter of FIG. 4a; FIG. 4c illustrates an exemplary configuration register; FIG. 4d is illustrative of an exemplary rotating priority scheme for the arbiter of FIG. 4a.

DETAILED DESCRIPTION OF THE INVENTION

In the following description for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention unnecessarily.

Figure 1:
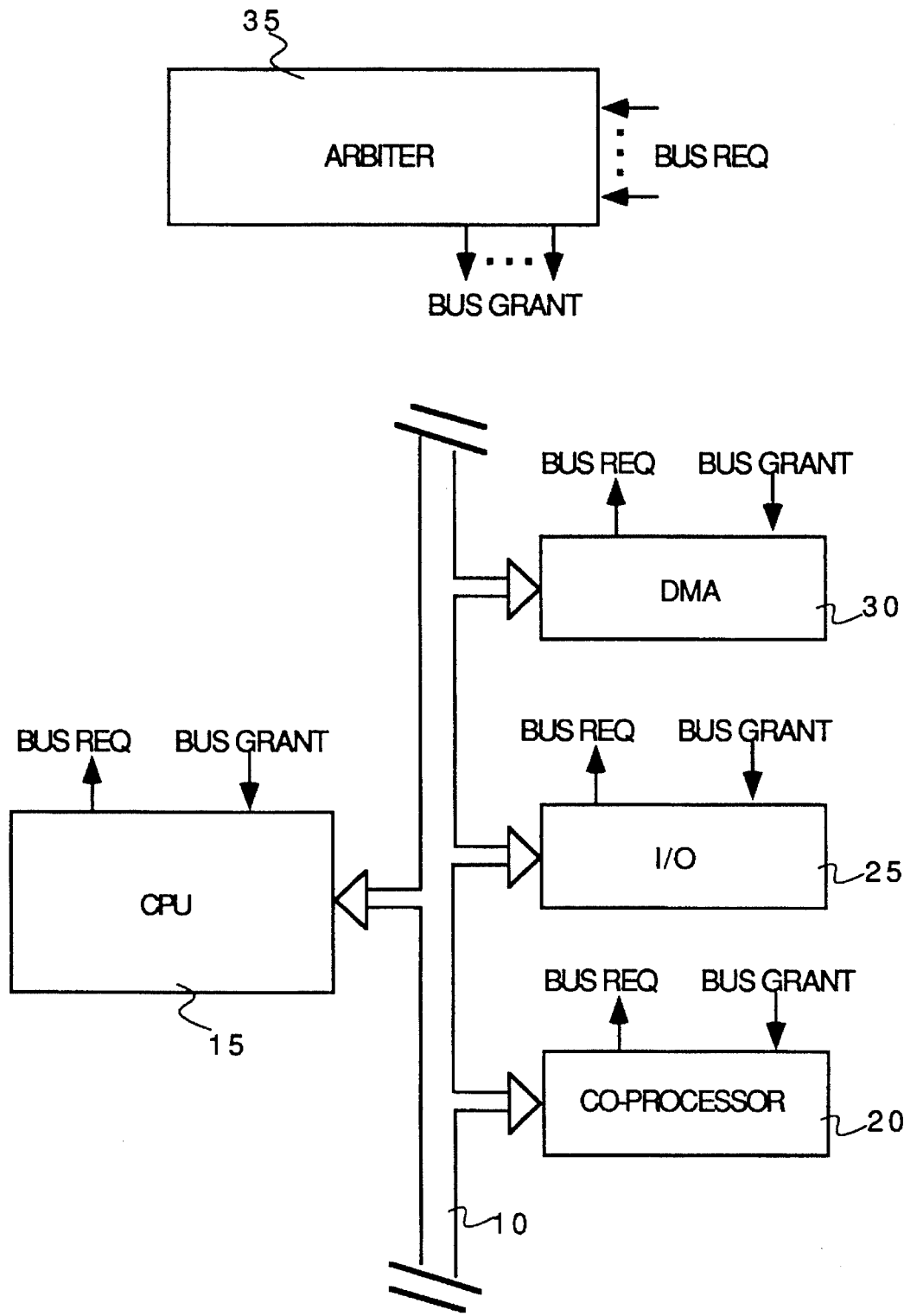
FIG. 1 illustrates an exemplary system of the present invention.

An exemplary system is shown in FIG. 1. A bus 10 is used to interconnect a plurality of components including a CPU 15, coprocessor 20, I/O device 25 and DMA 30. Each device which can issue a request on the bus typically includes two signal lines that connect to arbiter 35, bus request (BUSREQ) and bus grant (BUSGRANT). When a device requests access to the bus 10, the device issues a bus request to the arbiter. The arbiter then arbitrates all bus requests received and issues a bus grant signal to the device which has the highest priority. The device can then access the bus once the bus grant signal is received.

In the present invention the priority of devices is programmable and therefore can be dynamically modified to accommodate different system configurations and priority situations without the need to physically move the location of the bus request and bus grant inputs to the arbiter in order to change priority. The logic utilized in the arbiter 35 is composed of a plurality of arbiter banks, an example of which is shown in FIG. 2a. The arbiter bank receives at least two bus request inputs 50, 55 and generates a bus grant signal 60 according to priority indicated by the fixed control signal input 65 and rotate control signal input 70. The control signals 65, 70 operate in a manner such as shown by the table of FIG. 2b. If the rotate control bit is set, the block will operate in a rotating priority scheme wherein, for example, bus request 1 is first granted priority after which bus request 2 is granted priority, after which bus request 1 again is granted priority. Thus, the alternating priority or rotating priority scheme will continue until the control signals 65, 70 are modified. If the rotate control signal 70 is not set, then a fixed priority for that particular bank is implemented. Thus, for example, if the fixed control signal input 65 is set, bus request 1 will be granted priority. If the fixed control signal input 65 is not set, bus request 2 will be granted priority. The bus grant signal 60 may be output through a single output in a manner identifying the request granted access or a plurality of output pins corresponding to and identifying the bus request inputs whereby the corresponding output generates a signal indicative of bus grant of a particular request.

The arbiter bank can be expanded into a multiple bus request input bank such as that shown in FIG. 3a, which illustrates a three-input arbiter bank. In this illustration the fixed control signal input bank comprises two signal inputs a 75, b 80 and the rotate control input 85. The bank then arbitrates, for example, in the manner shown in the table of FIG. 3b.

Figure 4A:
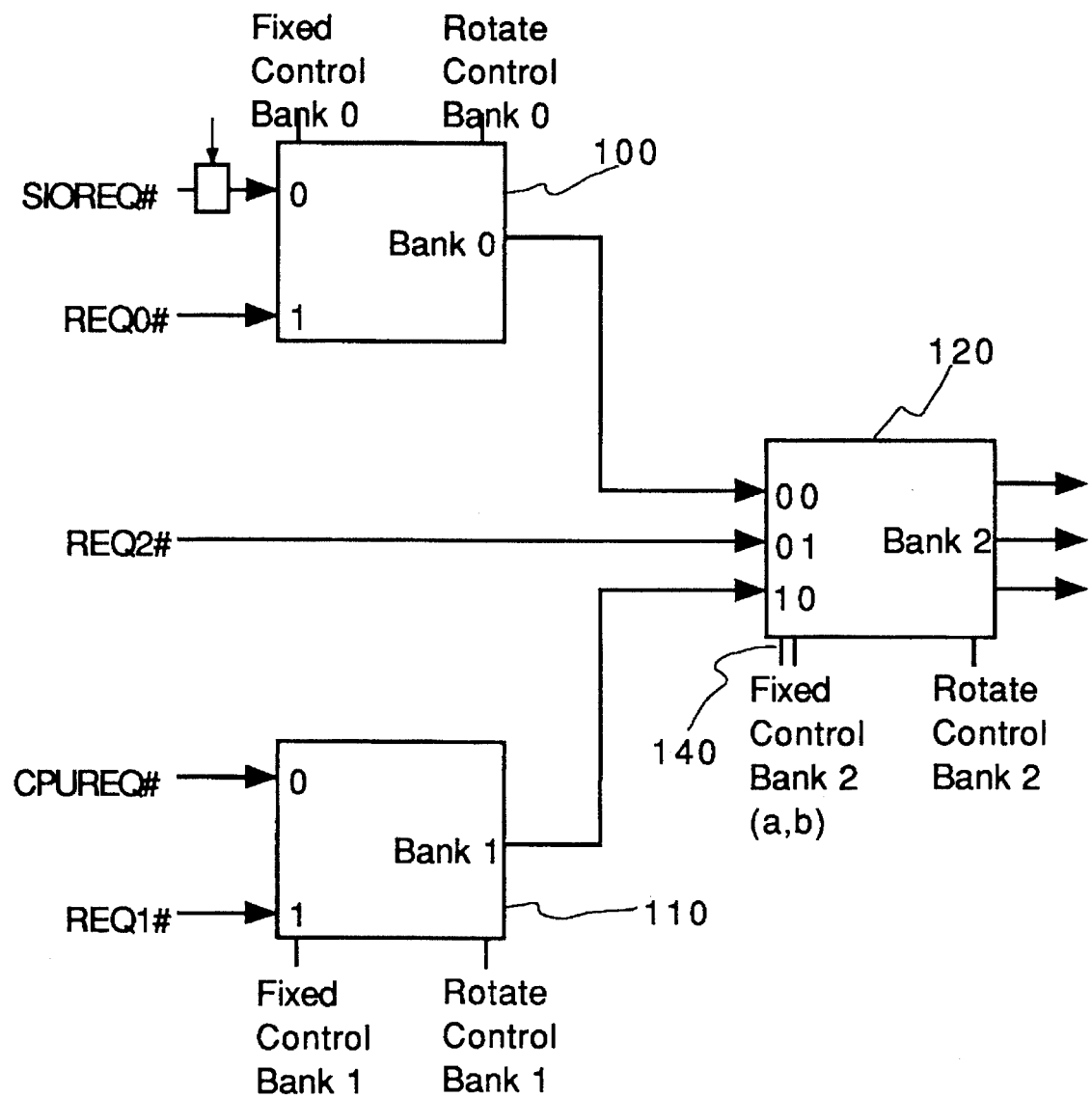
FIG. 4a is a block diagram of an exemplary arbiter consisting of multiple arbiter banks connected in a cascading manner.

These individual banks can be interconnected in a cascading manner to provide a plurality of options and prioritization schemes. An example of a three bank arbiter is shown in FIG. 4a. Referring to FIG. 4a, the arbiter consists of three arbiter banks, Bank 0 100, Bank 1 110 and Bank 2 120. Banks 0 and 1 100, 110, each have two bus request inputs and two control inputs Fixed Control Bank 0, Rotate Control Bank 0 and Fixed Control Bank 1, Rotate Control Bank 1. Bank 2 is a three input arbiter bank which accepts as one input the output of Bank 0. The other input is the output of Bank 1 and the third input is a bus request from a master device coupled to the bus. As three inputs are provided to the bank, the fixed control input 140 comprises two signal inputs to cover the three possible fixed priority cases.

Great flexibility in priority schemes is provided in this simple but effective arbiter. One fixed priority scheme is illustrated by the table of FIG. 4b. Alternately, other fixed priority schemes can be implemented. It should be realized that additional priority schemes can be generated by changing one or all of the control status bits in one or all of the banks. For example, Bank 0 may be programmed to a fixed priority, Bank 1 to a rotating priority and Bank 2 to a rotating priority. Alternately, Bank 0 and 1 can be set to a fixed priority and Bank 2 to a rotating priority. It can be envisioned that in accordance with the desired result the arbiter banks can be easily programmed to provide the priority scheme desired. Preferably, a arbiter configuration register is provided for storage of the control signals used to control the banks. FIG. 4c is illustrative of a configuration register to support the arbiter structure illustrated in FIG. 4a. Each bank comprises logic to generate a bus grant signal in accordance with the state of the control signals and the bus request inputs.

As noted above, the banks may be set to a rotating scheme, a fixed scheme or a hybrid of both. In particular, if a pure rotating priority scheme is selected in which all banks are set to a rotating priority, the priority may be set as described in FIG. 4d.

Figure 4E:
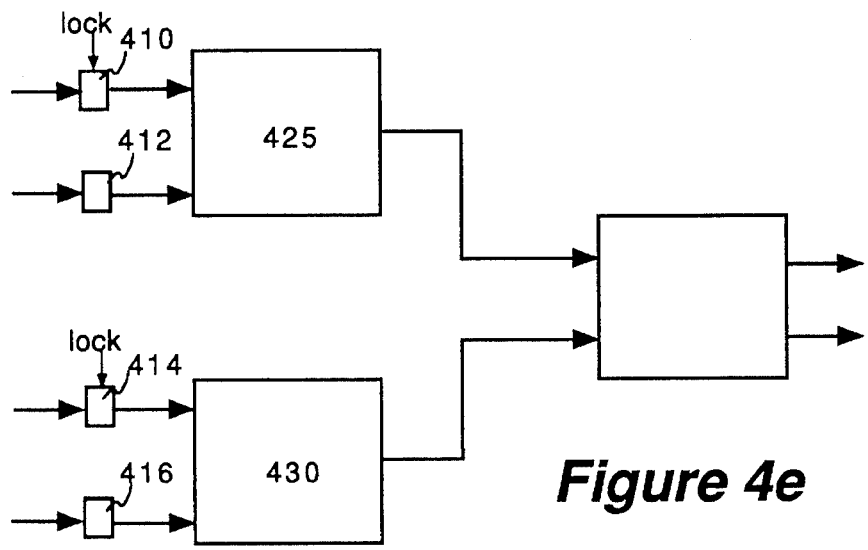
FIG. 4e is a block diagram illustration of an alternate embodiment of the present invention which selectively masks input requests.
Figure 4F:
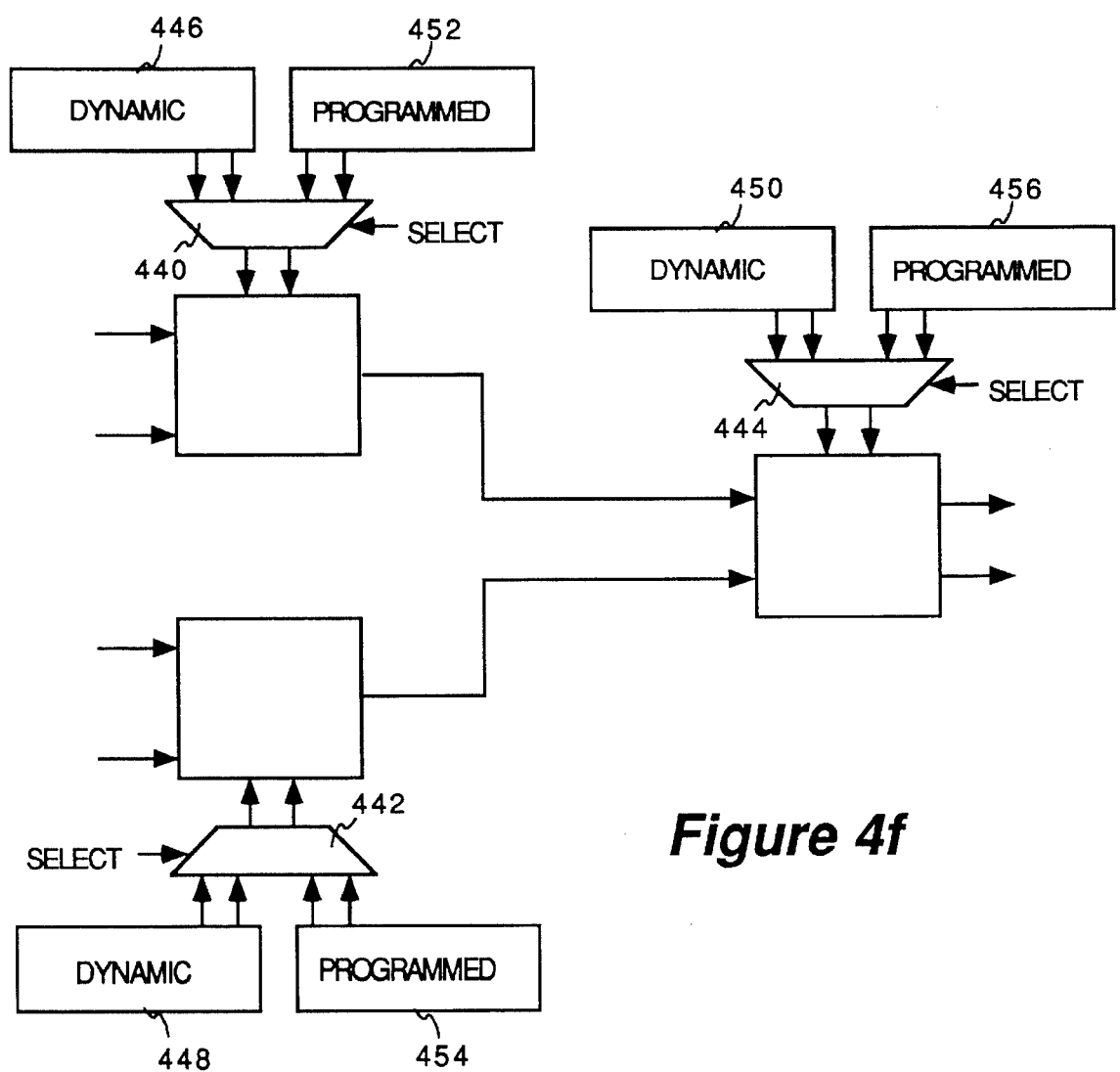
FIG. 4f is a block diagram illustration of an alternate embodiment of the present invention which selects between dynamic and programmed priority logic.

In an alternate embodiment, the arbiter can be configured to dynamically override the priority scheme programmed, for example, by the values stored in the arbiter configuration register. Thus, the priority can be changed without affecting the state of the register. FIG. 4f shows multiplexors 440, 442, 444 which can be operated to select a dynamically input priority 446, 448, 450 or programmed priority 452, 454, 456. Therefore, the system would include logic to select between dynamic control and programmed control. For example, if a lock cycle is executed, control can be switched to the dynamic control which adjusts the priorities accordingly. Once the lock cycles are completed, control can be switched back to the original programmed control priorities. The advantage to this embodiment is that the original programmed priorities can be maintained and immediately utilized after the event is complete.

Using the arbitration structure described herein, the arbiter can be configured to apply to a variety of different situations. For example, the arbiter can be configured to give a device a lock function. If a device requires access to the bus and issues a lock signal to lock out other devices from accessing the bus, the arbiter can be configured to give that device the highest priority until the lock signal is deasserted. This provides the device the ability to lock and unlock the bus. In an alternate embodiment, as illustrated in FIG. 4e, the arbiter can be configured with masking mechanisms 410, 412, 414 and 416 to mask all request inputs to ensure no interruption during lock cycles.

Figure 5:
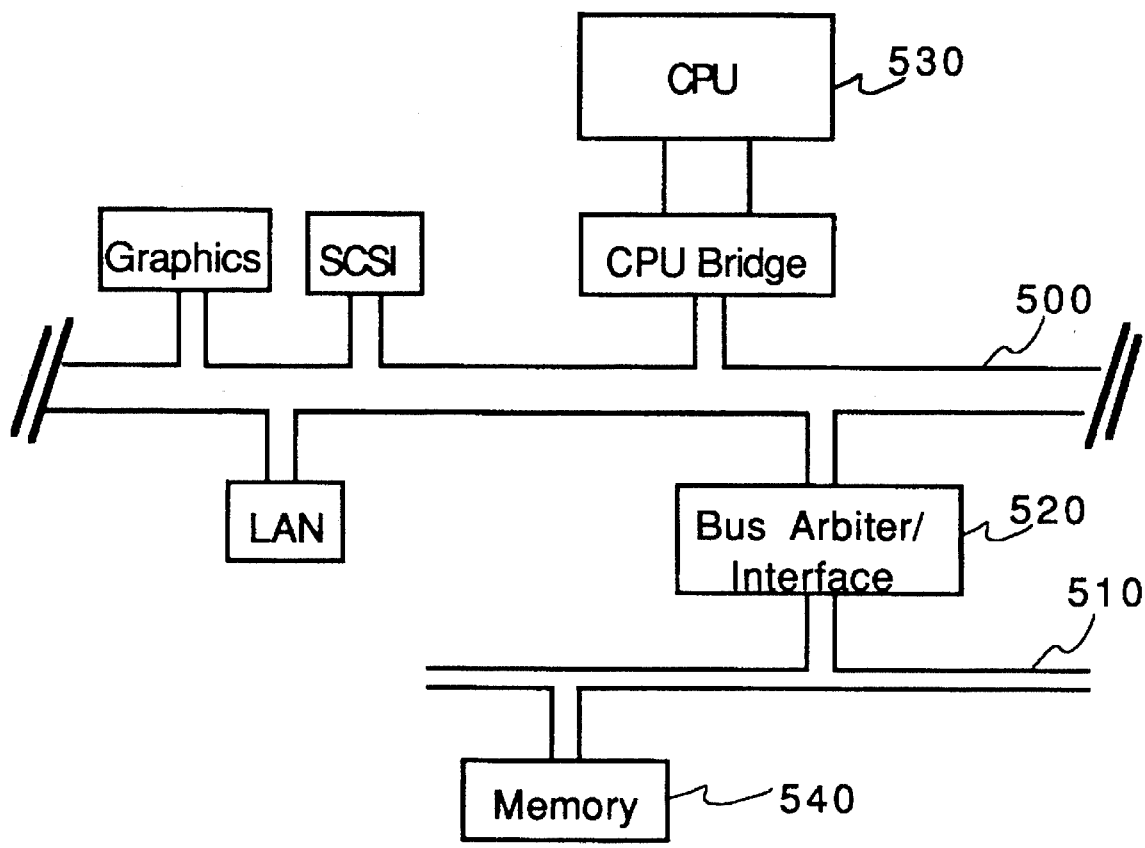
FIG. 5 is a system diagram of one implementation of an embodiment of the arbiter of the present invention.

The arbiter can also be configured to minimize retry thrashing. This is quite useful in a multiple bus configuration such as that shown in FIG. 5. The system shown has two buses, a high speed bus 500 and a lower speed bus 510. The arbiter 520 arbitrates accesses to bus 500 and 510. If, for example, a device such as CPU 530 requires access to a device on the slower speed bus 510, such as memory 540, the CPU first gains access to the first bus 500 and then to the second bus 510 in order to access memory. If access to the second bus 510 is not granted, then the request is denied and the retry request is then issued. In order to prevent the reissuing of multiple retry requests while waiting for the slower bus 510 to be released for access to save the bandwidth of the high speed bus 500, the priority for the CPU is modified temporarily such that the request is masked in order to eliminate the thrashing of requests. Alternately, the priority is modified to be of a lower priority. The bus arbiter will maintain a watch on the buses 510, 500, such that when the slower bus 510 is released, the priority of the CPU is again modified to its predetermined priority such that subsequent retries will be attempted and subsequently granted. Alternately, a retry may be timed, wherein the priority at the arbiter is again modified such that the request is masked until a certain time has elapsed, at which time normal priority is reinitiated thereby permitting a subsequent retry to be initiated.

The arbiter of the present invention also permits bus parking to be accomplished by the CPU or the arbiter itself. In this example, the CPU is granted the highest priority when bus parking is required, that is, when the bus is idle. If the CPU is granted priority for access but no outstanding bus request exists, the CPU then drives the bus to charge it to a predetermined state. Thus, the CPU functions as a parking agent for the bus. Similarly, if no outstanding bus request exists, the arbiter itself can perform the bus parking.

Figure 6:
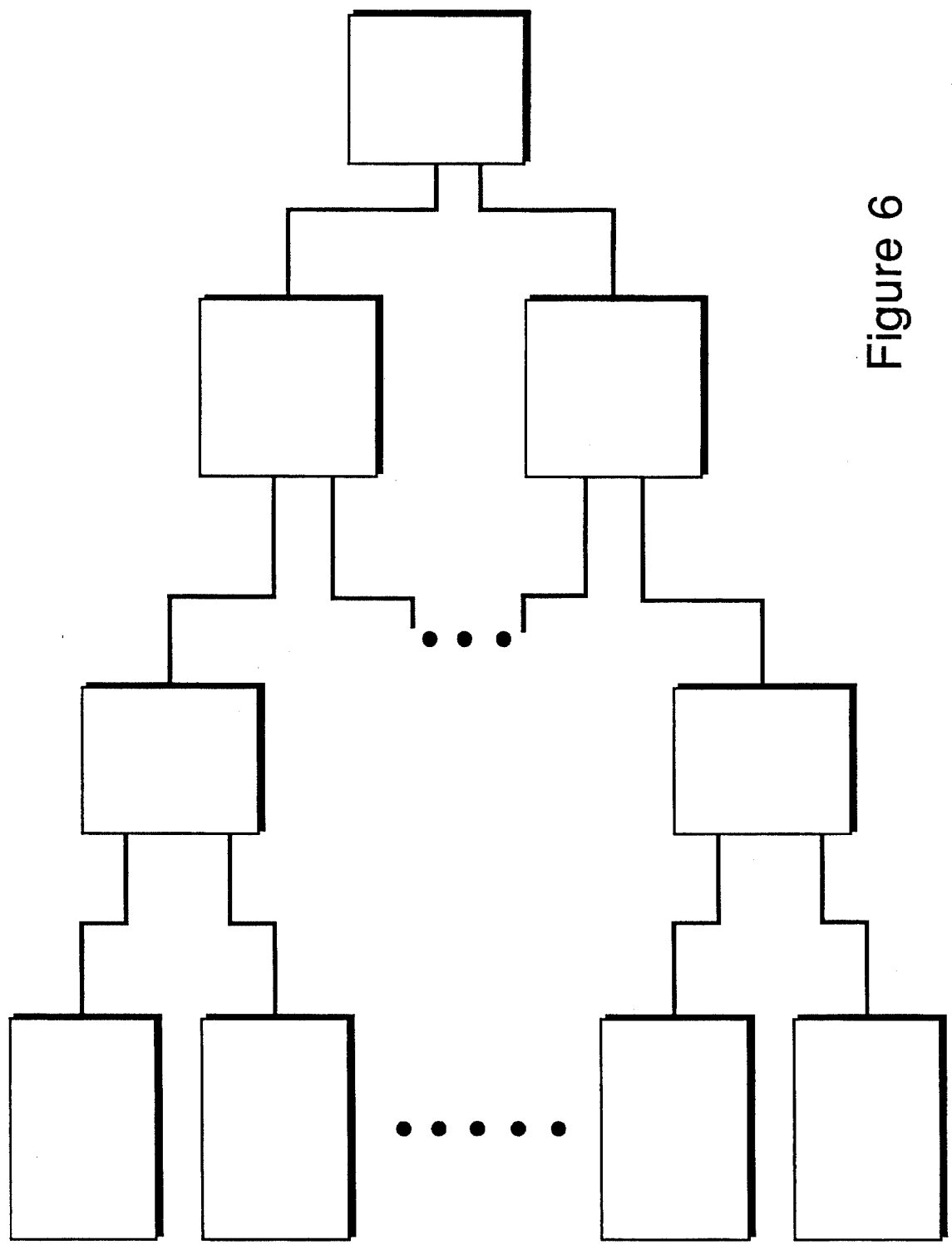
FIG. 6 is a block diagram illustrating the expansion of the arbiter to a greater number of banks.

The invention has been described in conjunction with the preferred embodiment. It is evident that numerous alternatives modifications, variations and uses will be apparent to those skilled in the art in light of the foregoing description. In particular, as is illustrated in FIG. 6, the arbiter can be constructed of an arbitrary number of banks. Furthermore, each bank can have a varying number of bus request inputs and corresponding number of fixed control inputs.

What is claimed is:

1. In a system comprising a plurality of devices coupled to a bus, a bus arbiter for determining priority for access to the bus based upon the receipt of at least one bus request issued by a device, said arbiter comprising:

at least one arbiter bank, each bank comprising a plurality of bus request inputs and outputting a signal identifying the bus request which is granted priority, each bank comprising a fixed control input and rotating control input, said rotating control input controlling the bank to operate in a rotating priority scheme when the rotating control input is in a first state and in a fixed priority scheme when the rotating control input is in a second state, said fixed control input comprising n input bits wherein $2^n$ is greater than or equal to the number of bus request inputs, said fixed control input identifying one of a plurality of fixed priority schemes for the bus request inputs when the rotating control input is in the second state, said rotating and fixed control inputs being programmable to configure the arbiter to operate according to different prioritization schemes, each of said prioritization schemes determining priority for each combination of bus request inputs.

2. The arbiter as set forth in claim 1, wherein the arbiter comprises multiple arbiter banks connected in a cascading manner in which the output of lower level arbiter bank is coupled as a bus request input to a higher level arbiter bank, each of said arbiter banks separately programmable by separately programming the rotating and fixed control inputs to control the priority scheme of the arbiter.

3. The arbiter as set forth in claim 1, wherein the number of bus request inputs equals two and the number of fixed control input bits equals 1.

4. The arbiter as set forth in claim 1, wherein the number of bus request inputs equals three and the number of fixed control input bits equals 2.

5. The arbiter as set forth in claim 1, further comprising a configuration register to store the values of the rotating and fixed control inputs to each arbiter bank.

6. The arbiter as set forth in claim 1, further comprising a controller for dynamically controlling the values of the fixed and rotating control inputs for each arbiter bank wherein the arbitration scheme of the arbiter is dynamically controlled.

7. The arbiter as set forth in claim 6, wherein the controller further selects dynamically controlled values or programmed values of the fixed and rotating control inputs.

8. The arbiter as set forth in claim 1, further comprising logic to selectively mask the bus request inputs.

9. In a system comprising a plurality of devices coupled to a bus, a bus arbiter means for determining priority for access to the bus based upon the receipt of at least one bus request issued by a device, said arbiter means comprising:

at least one arbiter bank means, each bank means comprising a plurality of bus request inputs and outputting a signal identifying the bus request which is granted priority, each bank means comprising a fixed control input means and rotating control input means, said rotating control input means controlling the bank means to operate in a rotating priority scheme when the rotating control input means is in a first state and in a fixed priority scheme when the rotating control input means is in a second state, said fixed control input means comprising n input bits wherein $2^n$ is greater than or equal to the number of bus request inputs, said fixed control input means identifying one of a plurality of fixed priority schemes for the bus request inputs when the rotating control input is in the second state, said rotating and fixed control inputs being programmable to configure the arbiter means to operate according to different prioritization schemes, each of said prioritization schemes determining priority for each combination of bus request inputs.

10. The arbiter means as set forth in claim 9, wherein the arbiter means comprises multiple arbiter bank means connected in a cascading manner in which the output of lower level arbiter bank means is coupled as a bus request input to a higher level arbiter bank means, each of said arbiter bank means separately programmable by separately programming the rotating and fixed control input means to control the priority scheme of the arbiter means.

11. The arbiter means as set forth in claim 9, wherein the number of bus request inputs equals two and the number of fixed control input bits equals 1.

12. The arbiter means as set forth in claim 9, wherein the number of bus request inputs equals three and the number of fixed control input bits equals 2.

13. The arbiter means as set forth in claim 9, further comprising a configuration means to store the values of the rotating and fixed control input values to each arbiter bank means.

14. The arbiter means as set forth in claim 9, further comprising a control means for dynamically controlling the values of the fixed and rotating control input means for each arbiter bank means wherein the arbitration scheme of the arbiter means is dynamically controlled.

15. The arbiter means as set forth in claim 14, wherein the control means further comprises means to select between dynamically controlled values or programmed values of the fixed and rotating controlled input means.

16. The arbiter as set forth in claim 9, further comprising masking means to selectively mask the bus request inputs.

17. A system comprising:

a plurality of devices;

a first bus which couples the plurality of devices;

an arbiter for arbitrating access to the bus by the plurality of devices, said arbiter comprising at least one arbiter bank, each bank comprising a plurality of bus request inputs and outputting a signal identifying the bus request which is granted priority indicative of the device to which to issue a bus grant signal, each bank comprising a fixed control input and rotating control input, said rotating control input controlling the bank to operate in a rotating priority scheme when the rotating control input is in a first state and in a fixed priority scheme when the rotating control input is in a second state, said fixed control input comprising n input bits wherein $2^n$ is greater than or equal to the number of bus request inputs, said fixed control input identifying one of a plurality of fixed priority schemes for the bus request inputs when the rotating control input is in the second state, said rotating and fixed control inputs being programmable to configure the arbiter to operate according to different prioritization schemes, each of said prioritization schemes determining priority for each combination of bus request inputs; and a control means for controlling the values of the fixed control and rotating control inputs.

18. The system as set forth in claim 17 wherein said control means comprises a central processing unit which sets and resets the fixed and rotating control inputs of the arbiter banks to control the priority scheme of the arbiter.

19. The system as set forth in claim 17 further comprising a configuration register which stores the states of the rotating and fixed control inputs which control the operation of the arbiter banks.

20. The system a set forth in claim 19, wherein the control means comprises a central processing unit which sets and resets bits representative of the states of the rotating and fixed control inputs.

21. The arbiter as set forth in claim 17, wherein the arbiter comprises multiple arbiter banks connected in a cascading manner in which the output of lower level arbiter bank is coupled as a bus request input to a higher level arbiter bank, each of said arbiter banks separately programmable by separately programming the rotating and fixed control inputs to control the priority scheme of the arbiter.

22. The arbiter as set forth in claim 17, wherein each device is coupled to the arbiter by a bus request input signal line and a bus grant output signal line, such that bus requests are issued to the arbiter via the bus request input signal line and bus grants are issued by the arbiter via the bus grant output signal line.

23. The system as set forth in claim 17, further comprising a second bus, said arbiter arbitrating access to the first bus and second bus, said control means setting the rotating and fixed control signals to prevent retry thrashing by a device attempting to access the first and second bus and the second bus is not available for access, said control means setting the priority of the device attempting to access the bus to a lower priority on the first bus to prevent subsequent retries from issuing and resetting the device to a higher priority on the first bus once the second bus is available for access.

24. The system as set forth in claim 17, wherein a device locks other devices from accessing a bus by issuing a lock signal to the control means which controls the fixed and rotating control signals to set the device to the highest priority thereby effectively locking out other devices from accessing the bus.

25. The system as set forth in claim 17, wherein a device locks other devices from accessing a bus by issuing a lock signal to the control means which masks the bus request inputs of all but the locking device, thereby effectively locking out other devices from accessing the bus.

26. The system as set forth in claim 17, further comprising dynamic fixed and rotating control inputs, said control means further comprising a selection means to select the programmed or dynamic fixed and rotating control inputs.

27. In a system comprising a plurality of devices coupled to a bus, a method for arbitrating device access to the bus by determining priority for device access to the bus based upon the receipt of at least one bus request issued by a device, said method comprising the steps of:

providing at least one arbiter bank, each bank comprising a plurality of bus request inputs and providing an output identifying the bus request which is granted priority, each bank comprising a fixed control input and rotating control input, said rotating control input controlling the bank to operate in a rotating priority scheme when the rotating control input is in a first state and in a fixed priority scheme when the rotating control input is in a second state, said fixed control input comprising n input bits wherein $2^n$ is greater than or equal to the number of bus request inputs, said fixed control input identifying one of a plurality of fixed priority schemes for the bus request inputs when the rotating control input is in the second state; and programming said arbiter by setting the values of said rotating and fixed control inputs to configure the arbiter to operate according to different prioritization schemes, each of said prioritization schemes determining priority for each combination of bus request inputs.

28. The method as set forth in claim 27, wherein said step of programming further comprising the steps of storing the values of the rotating and fixed control inputs in a configuration register and providing the values in the configuration register to the rotating and fixed priority input of the arbiter banks.

29. The method as set forth in claim 27, wherein said system further comprising a second bus, said method arbitrating access to the first bus and second bus, said method further comprising a method to prevent retry thrashing by a device attempting to access the first and second bus when the second bus is not available for access, said method comprising the steps of:

setting the priority on the first bus of the device attempting to access the bus to prevent subsequent retries from issuing; and resetting the device priority on the first bus once the second bus is available for access.

30. The method as set forth in claim 29 wherein the step of setting the priority comprises masking the bus request input and the step of resetting comprises unmasking the bus request input.

31. The method as set forth in claim 29 wherein the step of setting the priority comprises setting the device to a lower priority and the step of resetting the device priority comprises resetting the device to a higher priority.

32. The method as set forth in claim 27, further comprising a method wherein a device can lock other devices from accessing a bus comprising the steps of:

issuing a lock signal to the control means which controls the fixed and rotating control signals to set the device to the highest priority thereby effectively locking out other devices from accessing the bus; and resetting the priority of the device once the lock signal is deasserted to enable other devices to access the bus.

33. The method as set forth in claim 27, further comprising a method wherein a device can lock other devices from accessing a bus comprising the steps of:

issuing a lock signal which masks all but one bus request input, thereby effectively locking out other devices from accessing the bus; and unmasking the bus request inputs once the lock signal is deasserted to enable other devices to access the bus.

* * * * *